3,804,778
FLUORINATION CATALYST AND PROCESS
Ramanadin, Salindres, France, assignor to Societe Rhone-Progil, Courbevoie, France
No Drawing. Filed May 1, 1972, Ser. No. 249,672
Claims priority, application France, May 6, 1971, 16,333
Int. Cl. B01j *11/78*
U.S. Cl. 252—441          13 Claims

ABSTRACT OF THE DISCLOSURE

A process for the preparation of a fluorination catalyst wherein chromium and nickel salts of organic acids are treated at an elevated temperature under vacuum or in an inert atmosphere to produce non-stoichiometric inorganic compounds in which the chromium has a valence between 2 and 3 and the nickel has a valence between 0 and 2, and the mixture of the non-stoichiometric compounds thereby obtained is shaped and is then contacted with anhydrous hydrogen fluoride at an elevated temperature. The catalysts of the present invention are useful in the preparation of perfluoro compounds by reaction of perhalogenated compounds with hydrogen fluoride.

---

The present invention relates to a catalyst in vapor phase fluorination of perchloro compounds and to the preparation and use of the catalyst to carry out the perfluorination of perchloro compounds.

It is known that numerous metal compounds exhibit a catalytic effect in the gaseous phase fluorination reaction of functional perchloro compounds such as hexachloroacetone, trichloroacetyl chloride and trichloroacetaldehyde with HF. Thus, chromium oxide $Cr_2O_3$, chromium fluoride $CrF_3$ and chromium oxyfluorides are described for this purpose in the French Pat. Nos. 1,369,784; 1,372,-549; 1,369,783 and 1,343,392.

Most of the perfluorination catalysts of the prior art lead to a fluorination rate of less than 80%. Fluorination rate is defined as the ratio expressed in percent between the number of HF moles which entered the reaction and the number of HF moles theoretically necessary to obtain the complete fluorination of the organic starting compound.

Although the catalyst of the French Pat. No. 1,372,549 is capable of providing hexafluoroacetone from hexachloroacetone with a good selectivity, its activity is insufficient because the productivity in hexafluoro acetone is extremely low, of the order of 25 grams per hour and per kilogram of catalyst, which is of little or no interest in an industrial application of this catalyst.

If an attempt is made to increase the productivity of such a catalyst in the perfluorination of functional compounds, for example by elevating the reaction temperature, only limited yields are obtained due to significant parasitic reactions of cracking (12 to 20 mole percent) leading to a destruction of the carbon skeleton of the molecule with the formation of CO and of chlorinated and/or fluorinated aliphatic hydrocarbons.

Moreover, the lifetime of catalysts of the prior art leaves much to be desired; the loss of activity in the course of time is more than 10% per 100 hours of operation. The term "activity of the catalyst" is defined herein by the number of HF moles effectively fixed per hour and per kilogram of catalyst on the functional compound to be fluorinated.

It is an object of the present invention to provide a catalyst for use in fluorination of perhalogenated functional compounds which overcomes the foregoing disadvantages, and it is a more specific object of the invention to provide a catalyst for use in the fluorination of perhalogenated compounds which is capable of achieving complete fluorination of such compounds with a fluorination rate above 90%, with a productivity significantly higher than prior art catalysts, while limiting parasitic cracking reactions to below 10 mole percent and with a loss in activity of less than 10% per 1000 hours of operation.

It is a related object of the invention to provide a process for the perfluorination of functional perhalogenated compounds using the catalyst of the invention.

According to the invention, the catalyst consists essentially of a non-stoichiometric inorganic chromium compound in which the valence of chromium is between 2 and 3, and a non-stoichiometric inorganic nickel compound in which the valence is between 0 and 2, the ratio of Ni atoms/(number of Cr atoms+number of Ni atoms) times 100 between 0.1% and 10%. The catalyst of the invention is obtained by carrying out the following steps:

(a) Thermal decomposition, separately or in mixture, of one or more organic chromium salts and one or more organic nickel salts in vacuum or in an inert atmosphere.

(b) Shaping of the product or the mixture of products resulting from step (a).

(c) Fluorination by anhydrous HF at a temperature between 100 and 500° C. of the product resulting from step (b).

"Non-stoichiometric compound of chromium and/or nickel" as used herein refers to a compound in which the valence of the constituent metal element is not an integer but is a fractional or an irrational number.

According to one method for obtaining the catalyst of the invention, chromium oxalate and nickel oxalate are used as organic salts subjected to phase (a) above. The chromium oxalate is calcined at 370–400° C. under vacuum or in an atmosphere of an inert gas, such as nitrogen or argon. Nickel oxalate is calcined under the same conditions. The resulting calcined products are mixed in the proportions corresponding to the ratio of number of nickel atoms/Ni atoms+Cr atoms defined above.

It has been discovered that the valence of chromium as a result of phase (a) is less than 3, while still remaining above 2. In fact, the thermal decomposition of chromium oxalate can be schematized in the following equations:

$$(C_2O_4)_3Cr_2 \rightarrow Cr_2O_3 + 3CO + 3CO_2 \qquad (I)$$

$$(C_2O_4)_3Cr_2 \rightarrow 2CrO + 2CO + 4CO_4 \qquad (II)$$

It has been found by the analysis of the released gases that, in reality, more $CO_2$ is formed than the only classical Equation I anticipated. This excess of $CO_2$ in relation to the theory of Equation I is explained by Equation II.

Indeed, during the decomposition of chromium oxalate under vacuum or in inert gaseous atmosphere (nitrogen, argon), there has been noted a mole ratio of $CO_2/CO$ higher than 1 but lower than 2.

If $x$ is the fraction of a chromium oxalate mole reacting according to Equation I, $(1-x)$ mole represents the supplement of a mole reacting according to Equation II. The valence of chromium in the final oxide and the mole ratio $CO_2/CO$ obtained are derived from the following equations:

$$x(C_2O_4)_3Cr_2 \rightarrow xCr_2O_3 + 3xCO + 3xCO_2$$

$$(1-x)Cr_2(C_2O_4)_3 \rightarrow 2(1-x)CrO + 2(1-x)CO + 4(1-x)CO_2$$

and thus $$\frac{CO_2}{CO} = \frac{4-x}{2+x}$$

and the valence of chromium is equal to $(2+x)$.

For example, in a calcination test of Cr oxalate, a mole ratio of $CO_2/CO = 1.6$ has been found which furnishes a value of $x$ equal to about 0.30. The valence of chromium thus is 2.30.

Analogous considerations make it possible to determine the valence of the non-stoichiometric mineral compound of nickel, ranging between 0 and 2, or the valence of chromium and of nickel when another organic salt of these metals is calcined, such as formate salts.

Thus, the decomposition of nickel oxalate under vacuum or in gaseous inert atmosphere (nitrogen, argon) shows a mole ratio of $CO_2/CO$ higher than 1.

If $y$ is the fraction of a mole of nickel oxalate reacting according to Equation III, $(1-y)$ mole represents the complement of a mole reacting according to Equation IV below:

$$yC_2O_4Ni \rightarrow yNiO + yCO_2 + yCO \quad (III)$$

$$(1-y)C_2O_4Ni \rightarrow (1-y)Ni + 2(1-y)CO_2 \quad (IV)$$

and from this $$\frac{CO_2}{CO} = \frac{2-y}{y}$$

and the valence of nickel is equal to $2y$.

However, the present invention should not be considered as being limited in any manner by the foregoing theoretical considerations.

Chromium oxalate and/or nickel oxalate may be replaced by chromium and/or nickel formate, acetate, propionate, lactate, maleate, fumarate, succinate, tartrate, citrate.

The shaping of the catalyst according to phase (b) may be carried out by any known means, avoiding placing the product in contact with an oxidizing atmosphere during the operations. For example, the calcined oxalates are humidified by an aqueous deoxidized dextrine solution, followed by extrusion, drying at about 120–130° C., and calcination at 370–400° C. under a current of an inert gas, such as nitrogen or argon.

The product thus obtained has the characteristics of an amorphous structure according to X-rays, and a specific surface area generally ranging between 100 and 400 m.$^2$/gram.

Phase (c) according to the invention can be effected in a reaction zone in the absence of an oxidizing atmosphere, for example, by placing the catalyst in a furnace heated to a temperature ranging between 100 and 500° C. and passing anhydrous HF and nitrogen or argon through the reaction zone until the HF content of the effluent is equal to the one entering the furnace. The time of treatment of phase (c) generally ranges from 1 to 12 hours.

The catalyst thus prepared is particularly applicable to the perfluorination of functional perchloro compounds such as trichloroacetyl chloride and hexachloroacetone.

The invention also relates to a process for the fluorination of functional perchloro compounds wherein the functional perchloro compounds and hydrofluoric acid are contacted with the catalyst of the invention at a temperature from 200 to 500° C., the hydrofluoric acid being present in at least a stoichiometric amount, with the contact time of the reactants ranging from 15 to 50 seconds, under the operative conditions of reaction. It is advisable to have a ratio of HF/perchloro compound at the beginning of the reaction from 5 to 100%, preferably 15 to 50% higher than the stoichiometric ratio.

Having described the basic concepts of the invention, reference is now made to the following examples which are provided by way of illustration and not of limitation, of the practice of the invention in the preparation of catalysts of the invention and their use in the fluorination of perhalogenated compounds.

EXAMPLE 1

Preparation of the catalyst 4.760 kilograms of chromium oxalate $$[Cr_2(C_2O_4)6H_2O]$$

and 72.8 grams of nickel oxalate $[NiC_2O_4, 2H_2O]$ are calcined separately in an electrically heated vertical tubular furnace under a current of nitrogen. The temperature inside the furnace is determined by means of a thermocouple. The heating is adjusted so as to attain a temperature of 375–400° C. at the rate of a rise in temperature of 20° C./hour. The heating is continued for 3–4 hours after a temperature of 375–400° C. has been reached.

During the decomposition of the chromium oxalate, the mole ratio of $CO_2 = CO$ is 1.5 which corresponds to a valence of the chromium of 2.4 in the calcined salt.

During the decomposition of the nickel oxalate, a mole ratio of $CO_2:CO = 2.1$ is observed, corresponding to a valence of the nickel of 1.28 in the calcined salt.

The salts thus calcined are then mixed intimately and crushed in a roller grinder under nitrogen atmosphere. Then the mixture is humidified with an aqueous deoxidized dextrine solution and the paste obtained is extruded, still under nitrogen atmosphere. Extrusion products are obtained from 4 to 8 mm. in diameter are obtained, with the length varying from 5 to 10 mm. The extruded products are dried in a tubular vertical furnace under nitrogen by gradually raising the temperature of the funace to 400° C. A mixture of non-stoichiometric nickel and chromium compounds is obtained where the relation of the number of nickel atoms to the number of chromium atoms plus number of nickel atoms, expressed in percent, is 1.9. Its specific surface area is 60 m.$^2$/gram.

These extrusion products are exposed at 200° C. to the action of gaseous anhydrous HF diluted by nitrogen (1 mole HF to 4 moles of nitrogen). The duration of the HF treatment is 8 hours.

The catalyst thus prepared is ready for use in the perfluorination reactions of perhalogenated compounds.

EXAMPLE 2

Preparation of the catalyst

A catalyst is prepared in which the relation of the number of Ni atoms to (number of Ni atoms+number of Cr atoms), expressed in percent, is 7.1. For that purpose, 6.188 kilograms of Cr oxalate $$[Cr_2(C_2O_4)3, 6H_2O]$$

and 0.364 kgs. of nickel oxalate $[NiC_2O_4, 2H_2O]$ are used. These organic salts are calcined separately, formed into the desired shape, dried and treated with anhydrous HF under operating conditions identical with those of Example 1.

Prior to the treatment with HF the specific surface of this product was 280 m.$^2$/gram.

In this example the valence of Cr is 2.2 and that of Ni is 1.3 in the non-stoichiometric product or compound after calcination.

EXAMPLE 3

Preparation of the catalyst 16,800 kg. chromium formate $[Cr(HCOO)_3, 6H_2O]$ and 0.680 kg. nickel formate $[Ni(HCOO)_2, 2H_2O]$ are calcined separately in a vertical furnace under a current of nitrogen. The heating is set so that a temperature of 375–400° C. is reached with the temperature rising at a rate of 20° C./hour. The heating is continued for 3–4 hours after temperatures of 375–400° C., have been reached.

The ratio of nickel atoms/(chromium atoms+nickel atoms) expressed in percent is 5. The valence of chromium is 2.4 and that of nickel 0.66 in the calcined product.

The calcined salts are mixed intimately, crushed, shaped, dried and then treated with anhydrous HF under the same operating conditions as in Example 1.

Prior to the treatment with HF, the product had a specific surface of 320 m.$^2$/gram.

Use of the catalysts

The catalysts of Examples 1, 2 and 3 were tested in the fluorination reaction of organic functional perchloro compounds and compared with a known catalyst.

The latter was prepared by addition of an aqueous ammonia solution to an aqueous solution of
$CrCl_3 \cdot 6H_2O$,
containing 1 mole/liter of this salt, until pH of 9 was reached. The resulting precipitate was filtered, washed with water, dried at 100° C. under nitrogen, shaped into extrusion products, calcined at 350° C. under nitrogen for 10 hours and treated with anhydrous HF diluted by $N_2$ (1 mole HF for 4 moles $N_2$) at 350° C. for 5 hours. All these operations are effected in a nitrogen atmosphere.

The specific surface of the product prior to the treatment with HF was 150 m.²/gram.

EXAMPLES 4 TO 6

Preparation of trifluoroacetic acid

A vertical cylindrical reactor, 36 mm. in diameter and 1000 mm. high, is loated with 900 cc. of catalyst of Example 1. The temperature of the reactor is adjusted to 320° C., and then anhydrous hydrofluoric acid and trichloroacetyl chloride are introduced simultaneously and continuously. The gases leaving the reactor, including HCl, HF, $CF_3COF$, cracking gas from trichloro acetyl chloride and possibly $CF_2ClCOF$ and $CFCl_2COF$ are collected in water and in a gasometer. The trifluoro acetic acid thus formed is then extracted from the acid waters. The results are shown in the table below.

The catalysts of Examples 2 and 3 respectively were also tested in Examples 5 and 6 of the table below, in the same reactor as the one of Example 4.

In addition, a comparative test was carried out with a representative catalyst of prior art, prepared as indicated above and tested under the operating conditions of Example 4.

The operating conditions and results obtained, after 100 hours of operation, are summarized in the following table:

|  | Example | | | Known catalyst |
|---|---|---|---|---|
|  | 4 | 5 | 6 | |
| Reaction temperature, ° C | 320 | 320 | 320 | 320 |
| Feed moles/hour per kg. of catalyst: | | | | |
| CCl₃COCl | 0.65 | 0.76 | 0.70 | 0.65 |
| HF | 4.70 | 5.01 | 5.08 | 4.70 |
| Contact time in seconds | 25 | 25 | 25 | 25 |
| Cracking rate in percent, 100 × (number of organic moles destroyed)/(number of organic moles used) | 8 | 9.5 | 8 | 21 |
| Impurities CF₂Cl COOH | 0 | 0 | 0 | 4 |
| Rate of conversion of CCl₃COCl into CF₃COOH | 92 | 90.5 | 92 | 75 |
| Activity of the catalyst: moles of HF fixed on trichloroacetyl chloride/hour per kg. of catalyst | 2.40 | 2.75 | 2.57 | 1.95 |
| Rate of fluorination in percent, 100 × HF moles being fixed/HF moles theoretically necessary | 99.9 | 99.9 | 99.9 | 78 |

The activity of the catalysts of Examples 4 to 6 is far superior to that of the catalyst of the prior art. Moreover, the catalysts of Examples 4 to 6 provide trifluoroacetic acid with a higher conversion rate than that observed with the catalyst of the prior art while limiting the cracking rate to 8–9.5% instead of 21%.

After 1500 hours of operation, the activity of each one of the catalysts of Examples 1, 2 and 3 according to the invention is characterized, respectively, by a fixation rate of HF on the functional compound to be fluorinated equal to 2.19 moles of HF/hour/kilogram of catalyst for Example 1, 2.56 moles HF/hour/kg. of catalyst for Example 2, and to 2.37 moles HF/hour/kg. of catalyst for Example 3.

The loss of activity respectively is 5.8% for catalyst 1, 4.6% for catalyst 2 and 5.15% for catalyst 3 for 1000 hours of operation.

The catalyst according to the prior art is characterized by an HF fixation rate equal to 1.62 moles HF per hour and per kg. of catalyst, which corresponds to a loss of activity of 12% per 1000 hours of operation.

EXAMPLE 7

Preparation of hexafluoro acetone

The same reactor as the one in Example 4 is used and is loaded with 900 cc. of the catalyst of Example 3. The temperature of the reactor is adjusted to 290° C. and anhydrous hydrofluoric acid and hexachloro acetone are introduced into it simultaneously and continuously.

The operating conditions and results obtained after 100 hours of operation are summarized in the table below. This table also shows the results from a comparative test carried out with the catalyst of the prior art described above in relation to Examples 4 to 6.

|  | Example 7 | Known catalyst |
|---|---|---|
| Feed moles/hour per kg. of catalyst: | | |
| CCl₃—CO—CCl₃ | 0.78 | 0.78 |
| HF | 7.0 | 7.0 |
| Contact time in seconds | 17 | 17 |
| Cracking rate in percent | 7.1 | 14.3 |
| Fluorination rate in percent | 98.6 | 84.2 |
| Impurities in mole percent: | | |
| Pentafluoromonochloro acetone | 6.6 | 38.0 |
| Tetrafluorodichloro acetone | 0.2 | 18.0 |
| Trifluorotrichloro acetone | 0.0 | 2.2 |
| Conversion rate into hexafluoro acetone | 86.0 | 27.5 |

After 1500 hours of operation, the catalyst according to the invention is characterized by a fixation rate of HF equal to 4.45 moles of HF per hour and per kilogram of catalyst. The loss of activity was 2.2% for 1000 hours of operation.

On the other hand, after 1500 hours of operation, the activity of the catalyst of prior art is characterized by a fixation rate of HF equal to 3.11 moles of HF per hour and kilogram of catalyst, which means a loss of activity of 14% per 1000 hours of operation.

These examples show the advantages of the catalysts prepared according to the method of the invention when they are used for perfluorination in vapor phase of functional perchloro compounds.

The catalysts according to the invention may be used to carry out perfluorination of very diverse functional perchloro compounds comprising in their molecules the following functional groups: ketones, aldehydes, nitriles, ether oxides and/or acid halides.

The presence in the catalyst of traces or small quantities of metal compounds other than chromium and nickel does not change the properties of the catalysts according to the invention and remains within its scope.

It will be understood that various changes and modifications can be made in the details of formulation, procedure and use without departing from the spirit of the invention, especially as defined in the following claims:

I claim:

1. A process for the preparation of a fluorination catalyst comprising the steps of thermally decomposing a chromium salt of a carboxylic acid and a nickel salt of a carboxylic acid in a non-oxidizing atmosphere to produce a non-stoichiometric chromium oxide in which the chromium has a valence between 2 and 3 and a non-stoichiometric nickel oxide in which the nickel has a valence between 0 and 2, shaping the chromium and nickel oxides in which the ratio of nickel atoms to the total of the number of chromium atoms and the number of nickel atoms, expressed as percent, is within the range of 0.1 to 10%, and contacting the shaped catalyst with anhydrous HF at a temperature within the range of 100° to 500° C. for 1 to 12 hours.

2. A process as defined in claim 1 wherein the chromium salt and the nickel salt are thermally decomposed separately to form the oxides and the oxides are admixed and the catalyst shaped.

3. A process as defined in claim 1 wherein the salts are thermally decomposed in admixture each with the other.

4. A process as defined in claim 1 wherein the salts are each thermally decomposed at a temperature of 370 to 400° C.

5. A process as defined in claim 1 wherein the salts are thermally decomposed under a vacuum.

6. A process as defined in claim 1 wherein the salts are thermally decomposed in the presence of an inert gas.

7. A process as defined in claim 1 wherein the salts of chromium and nickel are each selected from group consisting of oxalate, formate, acetate, propionate, maleate, fumarate, succinate, tartarate and citrate salts.

8. A process as defined in claim 1 wherein the chromium salt is chromium oxalate and the nickel salt is nickel oxalate.

9. A process as defined in claim 1 which includes the step of drying the catalyst after shaping it.

10. A process as defined in claim 9 wherein the drying is carried out under an inert atmosphere at a temperature of 120 to 130° C.

11. A process as defined in claim 1 wherein the shaped catalyst is contacted with HF under a non-oxidizing atmosphere.

12. A process as defined in claim 1 wherein the valences of the chromium and the nickel are each irrational numbers.

13. A catalyst composition consisting essentially of chromium oxide in which the valence of chromium is between 2 and 3 and nickel oxide in which the valence of nickel is between 0 and 2, with the ratio of nickel atoms to the total of the number of chromium atoms and the number of nickel atoms, expressed as percent, within the range of 0.1 to 10%, prepared by thermally decomposing a chromium salt of a carboxylic acid and a nickel salt of a carboxylic acid in a nonoxidizing atmosphere to produce a non-stoichiometric chromium oxide in which the chromium has a valence between 2 and 3 and a non-stoichiometric nickel oxide in which the nickel has a valence between 0 and 2, shaping the chromium and nickel oxides, and contacting the shaped catalyst with anhydrous HF at a temperature within the range of 100° C. to 500° C. for 1 to 12 hours.

References Cited

UNITED STATES PATENTS

| | | | |
|---|---|---|---|
| 2,744,147 | 5/1956 | Milks | 252—441 X |
| 3,172,882 | 3/1965 | Witt | 252—441 X |
| 3,239,450 | 3/1966 | Lindquist et al. | 252—441 X |
| 3,632,834 | 1/1972 | Christoph | 252—441 X |

PATRICK P. GARVIN, Primary Examiner

U.S. Cl. X.R.

260—465.7, 544 F, 593 H, 601 H, 614 F